(12) United States Patent
Patterson et al.

(10) Patent No.: US 7,216,757 B1
(45) Date of Patent: May 15, 2007

(54) DIFFERENTIAL MOTION CONVEYOR

(75) Inventors: Harold E. Patterson, Indiana, PA (US);
Paul Sleppy, Penn Run, PA (US);
Larry D. Martin, Lake Oswego, OR (US)

(73) Assignee: FMC Technologies, Inc., Houston, TX (US)

( * ) Notice: Subject to any disclaimer, the term of this patent is extended or adjusted under 35 U.S.C. 154(b) by 0 days.

(21) Appl. No.: 11/303,701

(22) Filed: Dec. 15, 2005

(51) Int. Cl.
*B65G 25/04* (2006.01)

(52) U.S. Cl. .................................. 198/750.8; 198/764

(58) Field of Classification Search ............ 198/750.1, 198/750.8, 761, 764, 765
See application file for complete search history.

(56) References Cited

U.S. PATENT DOCUMENTS

| | | | |
|---|---|---|---|
| 3,253,700 A | 5/1966 | Allen et al. | |
| 5,351,807 A | 10/1994 | Svejkovsky | |
| 5,409,101 A | 4/1995 | Ahmed et al. | |
| 5,794,757 A | 8/1998 | Svejkovsky et al. | |
| 5,850,906 A | 12/1998 | Dean | |
| 5,938,001 A | 8/1999 | Turcheck, Jr. et al. | |
| 5,979,640 A * | 11/1999 | Horton | 198/752.1 |
| 6,415,911 B1 | 7/2002 | Svejkovsky et al. | |
| 6,782,995 B2 * | 8/2004 | Didion et al. | 198/750.8 |

* cited by examiner

*Primary Examiner*—James R. Bidwell
(74) *Attorney, Agent, or Firm*—Christensen O'Connor Johnson Kindness PLLC

(57) ABSTRACT

A differential motion conveyor (20) for conveying products along an elongated trough structure (22) supported for reciprocal movement relative to a counterweight base structure (24) of a weight significantly greater than the weight of the trough structure. A rotational actuator (200) moving in a singular direction reciprocates the trough structure lengthwise relative and counterweighed base structure at a substantially continually varying velocity of the actuator to achieve a desired differential acceleration rate of the trough structure between the two opposing directions of longitudinal movement of the trough structure.

27 Claims, 12 Drawing Sheets

DIFFERENTIAL MOTION CONVEYOR

FIELD OF THE INVENTION

The invention relates to differential motion conveyors used to convey bulk materials. In particular, the invention relates to differential motion conveyors utilizing a servo motor drive system.

BACKGROUND OF THE INVENTION

Differential motion conveyors are used to convey many types of products, for example, snack foods or the like. Snack food manufacturers may utilize differential motion conveyors to convey product from cooking process equipment to packaging equipment. Differential motion conveyors employ conveying forces having substantially only horizontal components unlike vibratory conveyors in which the conveying forces have both horizontal and vertical components. Since little or no vertical force components exist, it is generally perceived that differential motion conveyors handle fragile material such as snack foods in a gentler manner and therefore have less product breakage and build-up of food particles or flavoring material on the conveying surface than do vibratory conveyors.

In a differential motion conveyor, the conveying surface is displaced from a point of origin to a point of maximum deflection at one speed and returned to the point of origin at a faster speed. Particles on the conveying surface are subject only to the normal force due to gravity and to the coefficient of friction between the particle and the conveying surface. When the acceleration of the conveying surface, reacting with the mass of the particle, is greater than the normal force ($F_n$) multiplied by the static coefficient of friction ($\mu_s$) of the particle, the particle slips relative to the conveying surface. When the acceleration of the conveying surface reacting with the mass of the particle is less than the normal force ($F_n$) multiplied by the kinetic coefficient of friction ($\mu_k$) of the particle, the particle stops slipping and moves with the conveying surface.

During the slower forward speed portion of the conveying cycle, the acceleration of the conveying surface, reacting with the mass of the particle, is less than $F_n \times \mu_k$, so the particles move with the conveying surface. During the faster return speed portion of the conveying cycle, the acceleration of the conveying surface, reacting with the mass of the particle, exceeds $F_n \times \mu_s$, so the particles slide on the conveying surface, leaving them in an advanced position relative to their starting position on the conveying surface. Therefore, there is a net movement of the particles on the conveyor surface in the direction corresponding to the slower portion of the conveying cycle. Shifting the point of the velocity profile pattern of the conveying surface 180° with respect to the position of the drive arm (i.e., a faster forward speed portion of the cycle followed by a slower return speed) reverses the direction in which the particles are being conveyed.

The average operating speed of the conveyor is influenced by how well the conveying surface velocity is controlled, particularly during the slow portion of the conveying cycle. Intuitively, higher cycle speeds should yield higher feed rates, but then the conveyor becomes more sensitive to changing velocity patterns, resulting in greater accelerations than may be desired during some of the conveying portion of the cycle, resulting in feed rate inefficiencies. Slippage between the particles being fed and the conveying surface is also impacted by the coefficients of friction as previously noted. As a result, some materials feed better than others, but the coefficients of friction typically are not a major influence on the potential feed rate capabilities of the conveyor. Also, it is noted that for any given operating speed, the ratio between the slower portion of the cycle and the faster portion is important. Generally, the time difference between the two portions of the cycle can be optimized for the most efficient feed rate.

The remaining factor influencing feed rate at any given operating speed is the conveyor stroke (displacement). At any operating speed, feed rate is proportional to the conveyor stroke, the longer the stroke the greater the feed rate. The limiting factors on stroke include mechanical and dynamic design considerations, power usage requirements, isolation efficiency, and overall cycle speed control capability.

Prior art differential motion conveyors include machines that utilize complex mechanical drive systems to generate the required differential motion patterns of the conveying trough member. One such mechanical drive falls within a class type known as "four shaft" differential motion conveyor drives. These drives employ first and second pairs of counter-rotating drive shafts, with one pair operating at twice the speed of the first pair. Eccentric weights are mounted on each pair of drive shafts such that out-of-balance forces are generated as the weights rotate. The weights on the higher speed shaft are about one-third of the weight of the slow speed shaft to produce the desired differential motion. The counter-rotating shafts are synchronized in an attempt to cancel lateral force components generated, while the axial force components cyclically subtract from one another in one half cycle of rotation of the slow speed shaft pair, and cyclically add together during the remaining half cycle of rotation. During the half cycle wherein the axial force components subtract from one another, the conveyor trough is displaced in one direction at a certain velocity and is returned during the half cycle wherein the axial force components add together, resulting in a greater velocity. Particles placed on the conveying member will therefore be fed in the direction corresponding to the slower displacement portion of the cycle as previously explained. Characteristic of such prior art conveyors is that their eccentric weight systems are synchronized such that the "shaft pairs" are in phase with each other at some point of rotation within the cycle.

One drawback to "four shaft" conveyor drives is their high cost relative to the modest throughput capabilities obtained. Ongoing preventative maintenance is a must since, like any other machine having belts, gears, bearings and other wear parts, they might fail at an inopportune time. The present invention seeks to incorporate and improve upon the smooth harmonic motion velocity patterns of such conveyors, while substantially reducing manufacturing cost and reducing other "after installation" costs.

U.S. Pat. No. 5,938,001 to Turcheck et al., discloses a "four shaft" conveyor drive, whereby the eccentric weights are synchronized such that the "shaft pairs" are out of phase with each other during the rotation cycle. Such phase shift tends to make the conveying member's velocity pattern more linear, reducing slippage of the particles during the slower portion of the conveying cycle. The resultant conveying member velocity pattern is said to provide up to 50% greater throughput compared to previous "four shaft" conveyor drive designs. This is said to be accomplished without any departure from the size, number of weights, and operating speeds typically found in such drive designs.

Other prior art differential motion conveyors include various mechanical and electromagnetic motor drives to produce the required differential velocity patterns for conveying. U.S. Pat. No. 5,351,807 to Svejkovsky utilizes a universal joint driven off-axis to generate differential motion. However, this construction may be limited in size due to scale up constraints, and it requires the use of a hydraulic brake damper to eliminate inertial load backlash at the speed transition points. The potential problem of a hydraulic oil leak in a food-handling environment from a sanitary perspective is undesirable. Also, the design requires that the base members be solidly connected to the floor, precluding the possibility of suspension mounting the conveyor, which is preferred by many food plant operators.

U.S. Pat. No. 3,253,700 to Allen utilizes elliptical gears to generate differential motion. This configuration also requires some form of mechanical damping to eliminate inertial load backlash and to reduce mechanical noise and resultant gear tooth damage. Hydraulic fluids and gear oil required for this drive also raises sanitary installation issues in food handling environments. This type of conveyor also requires that the base members be solidly connected to the floor, making suspension mounting difficult or ruling it out as an installation option.

U.S. Pat. No. 5,409,101 to Ahmed et al. covers a method, utilizing an electric or electromagnetic motor, to generate differential motion velocity patterns for a conveyor by supplying cyclic non-uniform power to the motor. The linear motor disclosed in this patent is relatively complex, is relatively expensive to make, and requires relatively high input power to operate, at an ongoing higher operating expense.

Other motor driven differential motion conveyor designs include U.S. Pat. No. 5,794,757 to Svejkovsky that discloses a motor and crank arrangement for reciprocating a conveyor tray. In one embodiment of this patent, the motor controller operates the motor shaft first at one speed, corresponding to the slower forward half cycle of the conveying member, and then at a faster speed as the crank arm reverses the direction of the conveying member during the second half cycle of operation. A rather sophisticated and complex counterbalance system is used in an attempt to neutralize the effects of inertial load backlash at the motion reversal transition points as the motor speeds up and slows down.

Studies by the present inventors have shown that it would not be possible to optimize the differential motion velocity patterns required for efficient operation and maximum throughput by simply operating the motor first at one speed during one half cycle and then at a second higher speed during the remaining half cycle. Also, the cranks, crank assemblies, linkages and multiple counterweights compensating for unwanted vibration and noise are costly to manufacture and costly to maintain. Further, it would not be practical to suspend the apparatus, as it must be connected to a firm foundation to operate correctly. It may also be difficult to reverse the direction of feed of the conveyor by simply inverting the motion pattern due to the complex nature of the counterbalance system.

U.S. Pat. No. 6,415,911 to Svejkovsky is said to eliminate the need for the crank assemblies and complex counterweight systems and associated linkages disclosed in the U.S. Pat. No. 5,794,757 patent, by reversing the direction of rotation of the drive motor during one-half cycle of conveyor operation. While this improvement may address the issues of design and maintenance costs, it has reduced electrical power operating efficiencies because the motor must stop and reverse itself in such a way as to not disturb the smooth differential motion velocity patterns required for the conveyor to operate in an efficient manner. This design does not address the issues of product feed rate optimization, suspension mounting of the conveyor, or simple reversal of feed direction of the conveyed product.

U.S. Pat. No. 5,850,906 to Dean discloses a motor-driven differential motion conveyor wherein the motor is said to rotate at a constant speed to displace the conveying member during the slower speed portion of the conveying cycle. An electro-magnetically controlled variable viscosity clutch/brake assembly, in conjunction with a programmable controller and a position sensor, releases the conveying assembly's drive shaft from the motor drive shaft, allowing the conveying assembly to reverse direction. The restoring force from the conveyor's spring system then drives the conveying assembly in the reverse direction at a higher speed than the motor drove it, to produce the differential motion velocity pattern. The speed during the return portion of the half cycle is determined by the natural frequency of the conveyor's mass/spring system. At the end of the fast portion of the cycle, the clutch/brake re-engages, and the conveying member is again driven in the opposite direction at the slower speed, as the cycle repeats.

Also disclosed is a method to set the relationship between the timing of the first and second half cycles of operation as was determined through computer simulation. The direction of feed is switched by noting the position of the conveying member and engaging the clutch/brake 180 degrees out of phase with where it was in the original feed direction. Although the transitions between clutch/brake engagement and disengagement may be made smoother by allowing some slippage as the electromagnetic field is turned on and off to the clutch/brake, the machine essentially operates at two speeds and may not be able to generate the most efficient differential motion velocity patterns for optimum feed rate. Also, the conveyor would be difficult to suspend, since a solid mounting foundation is required. In addition, the required spring system might make the design more costly to manufacture and sell.

SUMMARY OF THE INVENTION

A differential motion conveyor for conveying products includes an elongated trough structure with a counterweight base structure. A support system supports the trough structure for reciprocal movement of the trough structure relative to the base structure in a direction lengthwise of the trough structure. A drive system reciprocates the trough structure at a varying velocity to achieve a desired differential acceleration rate of the trough structure between the two opposing reciprocal directions of movement of the trough structure.

In accordance with a specific aspect of the present invention, the drive system includes a rotational actuator that rotates in a singular direction and a control system to continuously vary the speed of the rotational actuator to achieve desired levels of acceleration of the trough.

In a further aspect of the present invention, the control system accelerates the trough in one direction at a speed slow enough to substantially avoid relative sliding movement between the conveyed products and the trough structure, and accelerates the trough in the opposite direction at a fast enough speed to achieve relative sliding movement between the conveyed products and the trough structure.

In a further aspect of the present invention, the base structure is significantly heavier than the trough. The weight ratio between the trough structure and the base structure may be in the range of approximately 1:2 and 1:5.

In accordance with a further aspect of the present invention, the trough structure and counterweight base structure are configured so that the horizontal forces generated during operation of the conveyor pass substantially through, or close to, the vertical center of gravity of the conveyor.

In accordance with a further aspect of the present invention, a support frame supports the base structure at a desired elevation while allowing the base structure to reciprocate relative to the trough structure.

In further aspects of the present invention, the support frame may comprise a floor engaging stand, with the base structure suspended from the floor engaging stand. As an alternative, the support frame may support the base structure from a location above the conveyor, wherein a plurality of lines extend downwardly from overhead locations above the conveyor to support the base structure.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE INVENTION

Figure 1:
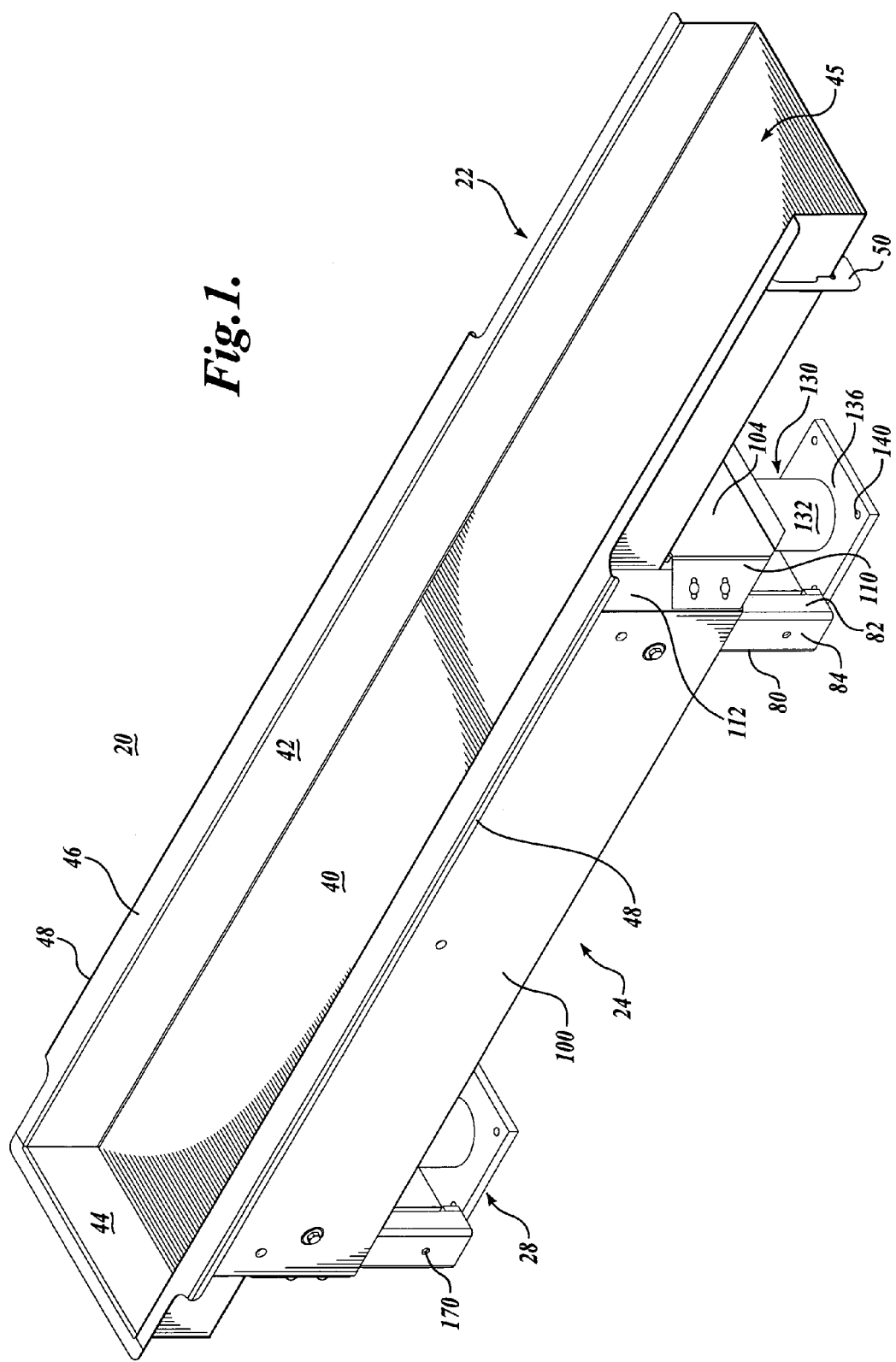
FIG. 1 is a pictorial view of one embodiment of a conveyor of the present invention taken from a location above and from the end of the conveyor.

Referring initially to FIGS. 1 through 4, conveyor 20 is illustrated as composed of an elongate trough structure 22 adapted to longitudinally reciprocate relative to a counterweight base structure 24 through a servo motor drive system 26. The base structure 24 is supported by a floor engaging stand or support frame 28 so as to be able to swing or reciprocate back and forth relative to the support frame by the use of a plurality of hanging swing arms 30 pivotally interconnected between the base structure and frame.

Next, describing the construction and operation of the present invention in greater detail, the trough structure 22 includes an elongated, flat pan 40 with upright sidewalls 42 and an upright end wall 44 at one end of the trough. One end of the trough 22 is closed off by end wall 44, while the opposite end 45 of the trough is illustrated as open. A top flange extends laterally outwardly from the upper edge of the sidewalls 42 and end wall 44 to add stiffness to the trough structure. As illustrated, the trough structure extends longitudinally from both ends of the base structure 24. The portion of the top flange 46 in the region of the base structure 24 is shown as being wider than along the remaining length of the sidewalls 42. Also along this wider section of the top flange 46, an edge flange or lip 48 extends downwardly from the top flange to overlap the adjacent upper edge portion of the base structure 24. It will be appreciated that the trough structure 22 can be of other constructions without departing from the present invention. For example, both ends of the trough structure may be open.

As shown in the figures, a stiffener brace 50 is positioned adjacent the open end 45 of the trough structure. The stiffener brace 50 can be of various configurations, including composed of a relatively thin, generally U-shaped member positioned to edgewise overlie and extend transversely outwardly from the sidewalls 42 and the underside of the trough pan 40. It will be appreciated that other types of stiffening devices may be utilized to enhance the stiffness and rigidity of the trough structure 22 at the open end 45 of the trough structure, as well as elsewhere along the length of the trough structure. It will also be appreciated that the trough is relatively light in weight, especially with respect to the weight of the base structure 24 as discussed more fully below. The trough structure can be made of numerous materials, including various metallic materials wherein the upper surface of the pan 40 may be polished or otherwise finished to a relatively smooth surface. The upper surface of the pan can be coated or clad with various materials to achieve a desired coefficient of friction with product being conveyed by the conveyor.

Figure 2:
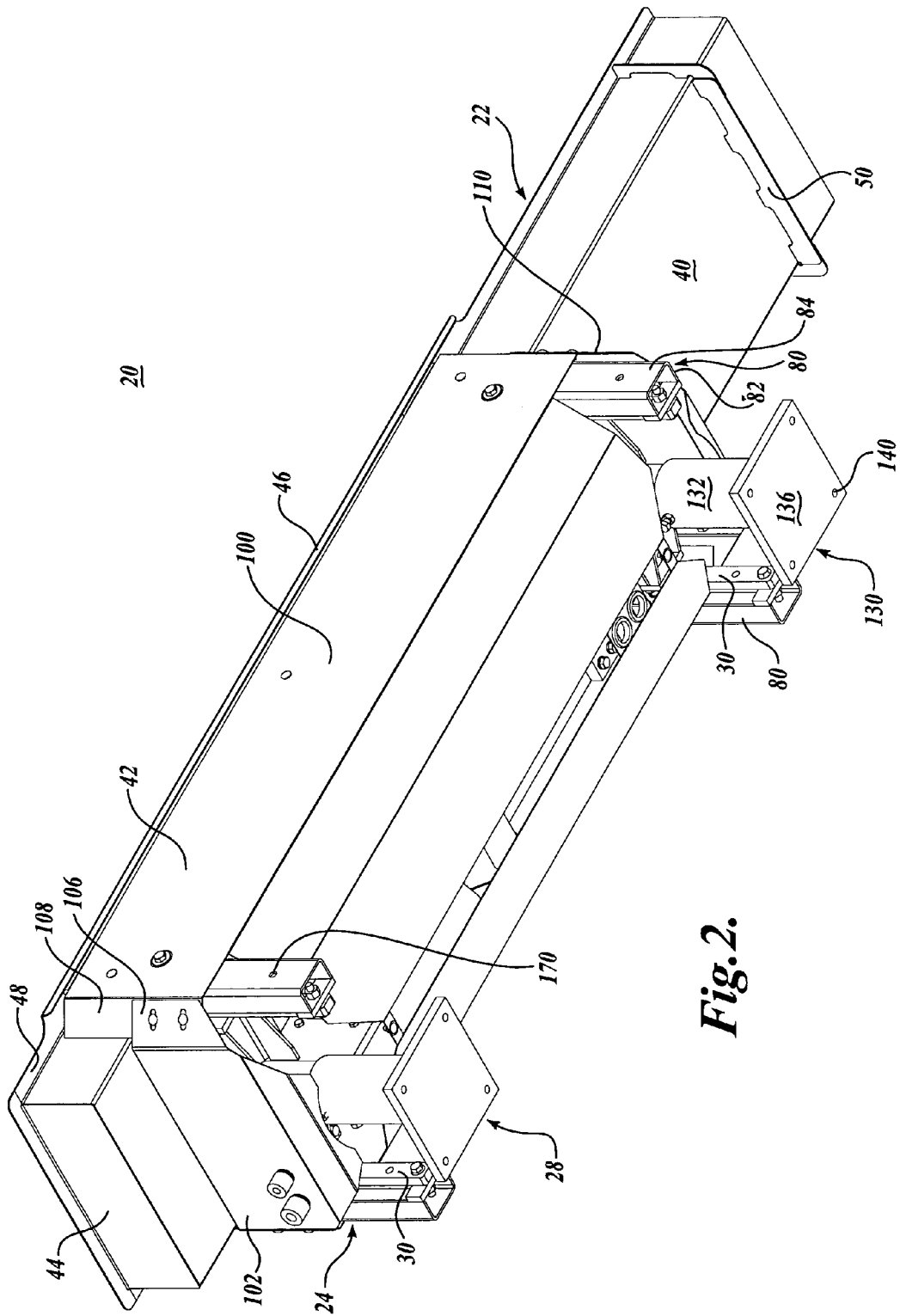
FIG. 2 is a pictorial view of the conveyor of FIG. 1 taken from below and the opposite end of the conveyor.
Figure 3:
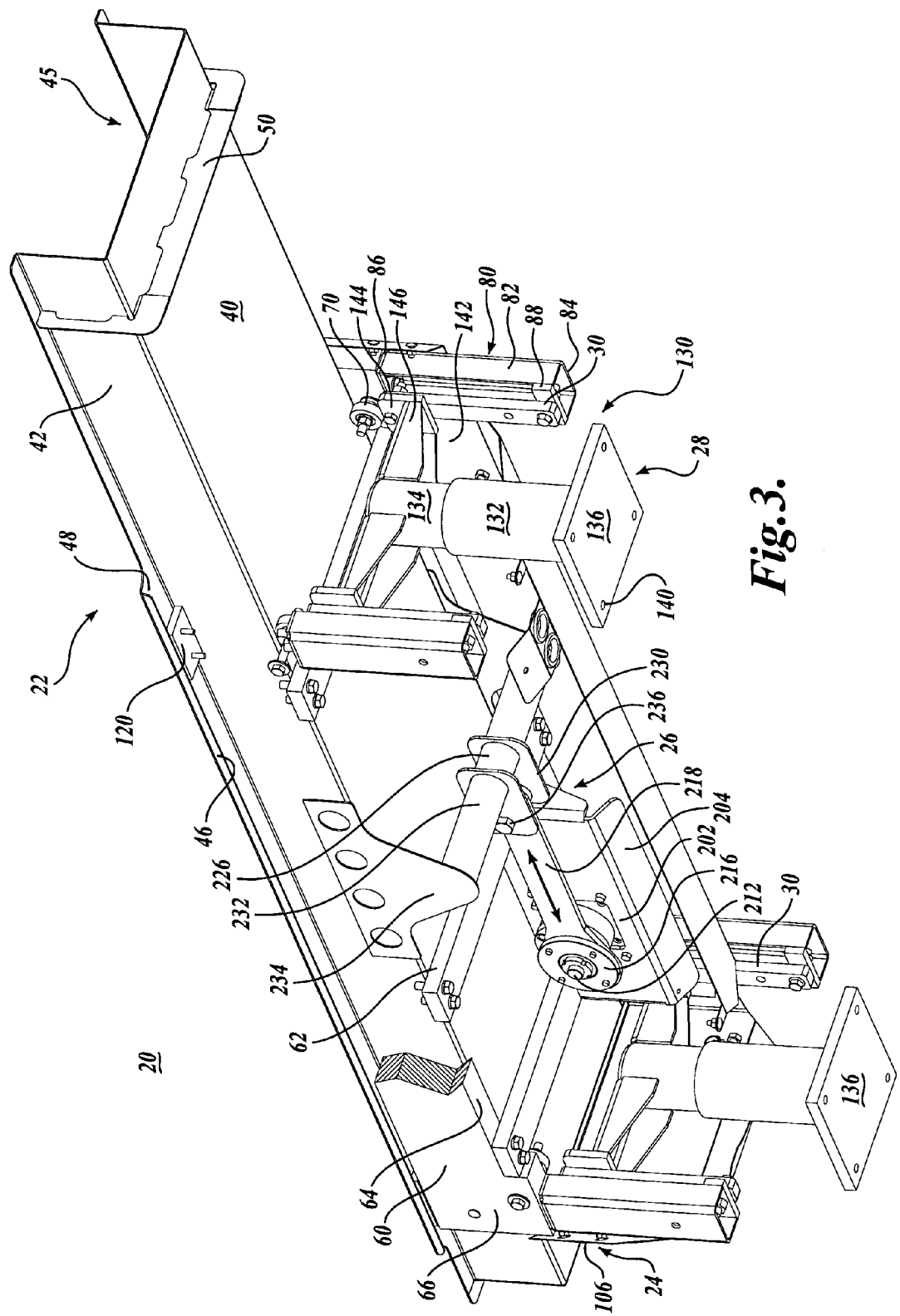
FIG. 3 is a pictorial view of the conveyor of FIG. 2 taken from the opposite end of the conveyor with portions removed so that the drive system for the conveyor is more clearly visible.
Figure 4:
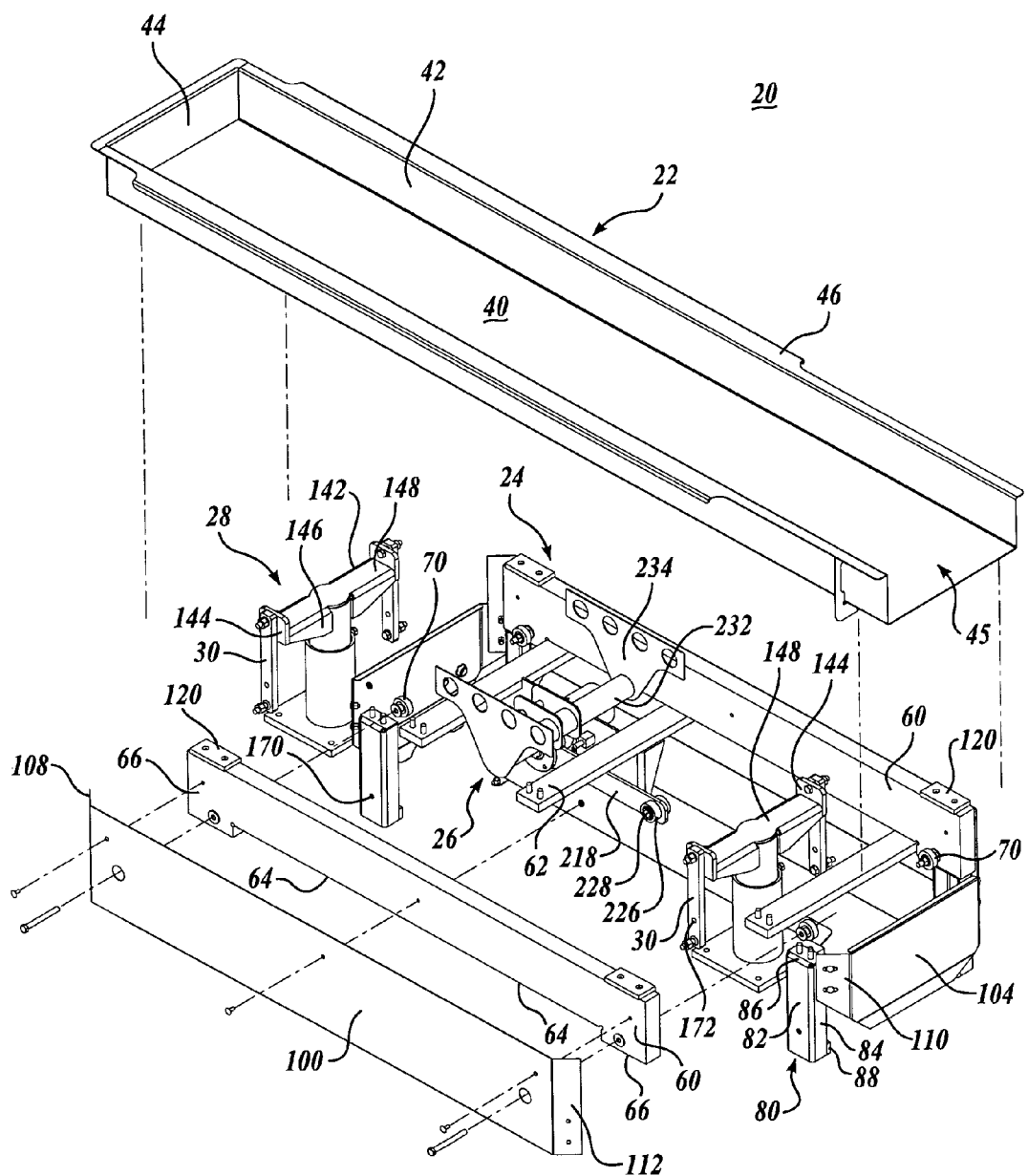
FIG. 4 is a partially exploded pictorial view of the conveyor shown in FIG. 1 taken from the opposite end of the conveyor.
Figure 7:
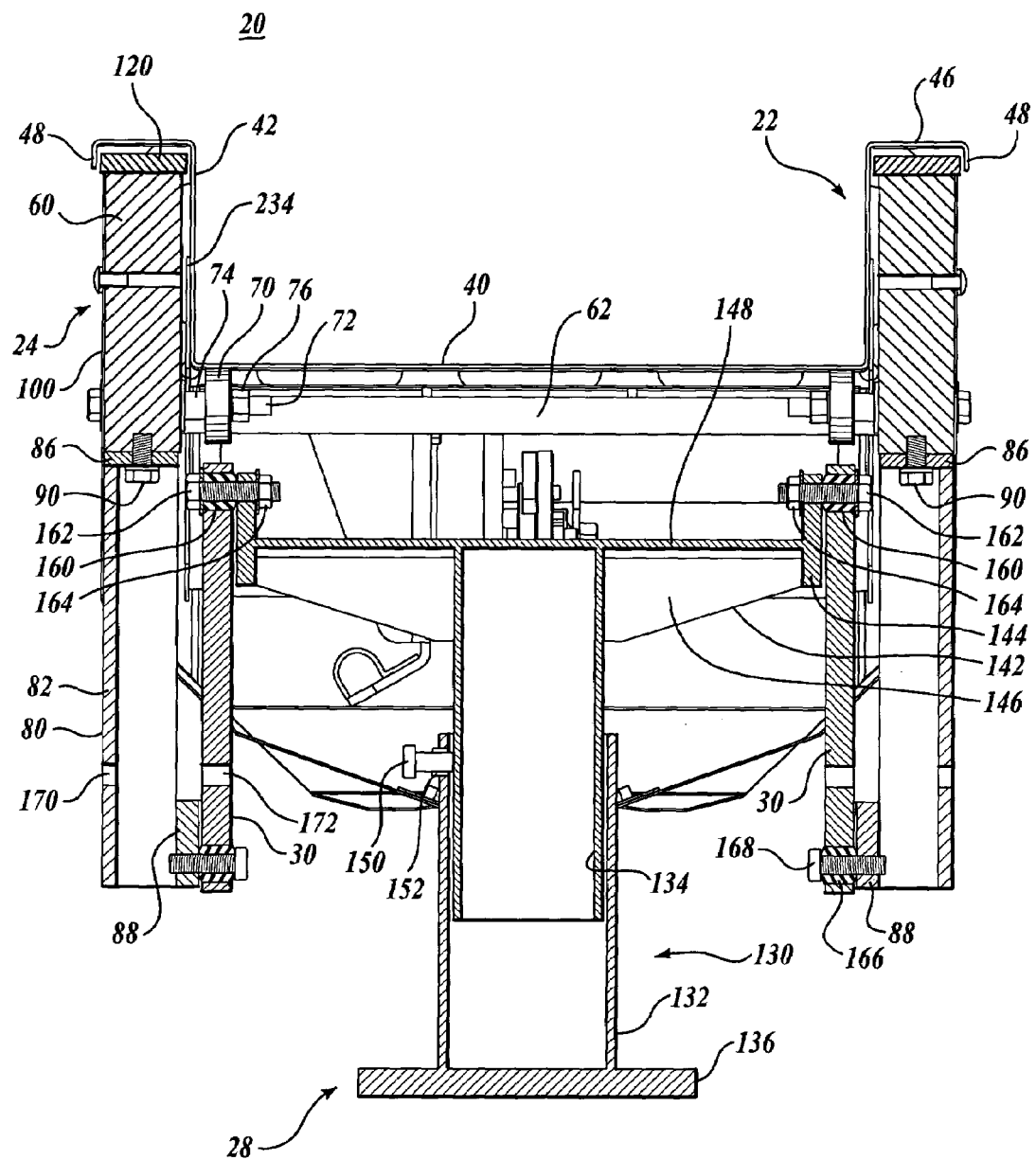
FIG. 7 is an enlarged cross-sectional view of the conveyor taken substantially along lines 7—7 of FIG. 6.

The counterweight base structure 24 may be of relatively straightforward construction consisting of two relatively thick side rails 60 positioned just outwardly of and substantially parallel to the sidewalls 42 of the trough structure 22. As shown in FIGS. 1, 2, and 7, the trough structure 42 is closely received between the side rails 60. The side rails may be interconnected by a series of crossbars 62 that are bolted or otherwise fixedly attached to the lower edge portions 64 of the side panels. As shown in FIGS. 3 and 4, such lower edge portions 64 are recessed upwardly from the lower edge portions of the ends 66 of the side rails 60. As perhaps best shown in FIG. 7, the thickness of the side rails 60 is illustrated as being significantly greater than the thickness of trough sidewalls 42. Such thickness contributes to the relatively greater mass of the counterweight base 24 relative to the trough 22.

The trough 22 is supported by roller assemblies 70 which are mounted on shafts 72 extending through clearance holes formed in lower portions of side rails 60 at the end portions 66 of the side rails. A spacer 74 may be employed to position the roller 70 somewhat inwardly of the inside surfaces or faces of the side rails so that the rollers are positioned to bear against the underside of trough pan 40 inwardly of sidewalls 42, see FIG. 7. Retaining hardware, for example, in the form of nuts 76 may be employed to retain the roller 70 in place as well as retain the shaft 72 stationary relative to corresponding side rail 60. Four roller assemblies 70 are illustrated as used to support the trough 22 relative to the counterweight base 24. Additional roller assemblies the same as or similar to roller 70 may be utilized, depending on various factors, such as the weight being carried by the trough 22 or the length of the trough.

Roller assemblies 70 may be replaced with other ways of supporting the trough for horizontal movement relative to the base structure. Such alternatives may include, for example, slides and slideways or pivot arms coupled to the trough and base structure or cables or suspension lines used to suspend the trough relative to the base structure.

Leg structures 80 depend downwardly from each end 66 of the two side rails 60. In transverse cross-section each of the leg structures is generally channel-shaped, composed of a sidewall 82 and endwalls 84. A flaptop or cap 86 extends across the upper end of each of the leg structures 80. Also, an inward cheek plate 88 extends across the lower inside portion of the leg structures to span between the sidewalls 82 thereof. The leg structures 80 may be mounted to the underside of the side rail end portions by hardware members 90 that extend upwardly through clearance openings formed in cap 86 to threadably engage the side rails. Of course, the leg structures 80 may be affixed to the side rails 60 by other methods.

As perhaps most clearly shown in FIGS. 1, 2, and 4, side cover panels 100, composed of relatively light gauge material, may overlap the exteriors of the side rails 60 and extend downwardly below the lower edge of the side rails. Also, end cover panels 102 and 104 are employed to cover the ends of the counterweight base below the elevation of the trough 22. End flaps 106 may be formed on end panels 102 to extend at approximately a 45° angle relative to the plane of the end panel 102 so as to overlap and match corresponding end flaps 108 formed in the adjacent end portions of side cover panels 100. Hardware members, for instance sheet metal screws, may be used to attach the end cover panel 102 to the side cover panels 100. Correspondingly, end flaps 110 may be formed at each end of the end cover panel 104 at approximately a 45° angle relative to the plane of the cover panel 104 thereby to overlap and match corresponding end flaps 112 formed in the adjacent end portions of side cover panel 110. Again, sheet metal screws, or other types of hardware members, may be utilized to attach the end panel 104 to the side panels 100. Of course, other types of structures may be utilized to form a protective cover for the counterweight base 24.

Generally rectangularly shaped guide blocks 120 are positioned on the upper edges of the side rails 60 at the ends 66 thereof so as to laterally constrain the trough 22 relative to the counterweight base 24. Such guide blocks 120 extend laterally slightly beyond the side faces of side rails and may be affixed to the upper edges of the side rails 60 by hardware members or other appropriate means. Also, the guide blocks 120 may be composed of low friction, wear resistant material so as to not significantly impede the relative movement between the trough 22 and the counterweight frame 24 if the adjacent trough side panels 42 or lips 48 bear against the guide blocks 120.

The frame or stand 28 is composed of a pair of pedestals 130 located adjacent the ends of the counterweight base 24 and laterally centrally thereof. Each of the pedestals may include a bottom tubular section 132 that slidably and telescopically receives a slightly smaller diameter upper tubular section 134. A floor plate 136 is attached transversely to the bottom of the lower tubular section 132. Throughholes 140 may be formed in the floor plate 136 to receive bolts or other types of hardware members to fixedly attach the floor plate 136 to the floor or other surface located beneath the conveyor 20. Brackets 142 extend transversely outwardly from the upper ends of the upper tubular section 134 to terminate at face plates 144 extending transversely to the brackets 142 and thus, generally parallel to the length of the counterweight base 24. The brackets 142 include side plates 146 having lower edges that taper upwardly in the outward direction and a top plate section 148. Thus, in cross-section the brackets 142 may be generally U-shaped. The height of the pedestals 130 may be adjusted, for example, through the use of a friction bolt 150, engaged with a threaded insert 152 affixed in a through-hole formed in the sidewall of bottom tubular section 132 of the pedestal.

As mentioned above, swing or rocker arms 30 pivotally interconnect base structure 24 with the frame 28. As shown in FIGS. 3, 4, and 7, the swing arms 30 may be in the form of elongate bars nominally disposed in upright orientation. The upper ends of the swing arms 30 may be pivotally attached to the face plates 144 of the pedestals 130 by bushing assemblies 160 snugly received within openings formed in the upper ends of the swing arms. Mounting bolts 162 extend through the center of bushing assemblies 160, through clearance openings formed in the upper portions of the face plates to threadably engage nuts 164 for retaining the bushing assembly and connecting the upper end of the swing arm to the face plate 144. As discussed more fully below, because the swing arms 30 are required to only swing through very small arcs during the operation of conveyor 20, elastic bushings such as bushings 160 are sufficient to accommodate such movement. Such movement does not require bushings capable of accommodating a full 360 degrees of relative rotation between face plate 144 and swing arms 30.

The lower ends of the swing arms 30 are connected to the lower ends of leg structures 80 in a manner similar to the connection of the upper ends of the swing arms to face plates 144. To this end, bushing assemblies 166 snugly engage within close-fitting through-holes formed in the lower ends of the swing arms. In addition, threaded bolts 168, or other types of connectors, may be used to extend through the center of bushing assemblies 166 and then to threadably engage cheek plate 88 on the lower inside end portions of the leg structures 80. Again, because of the small swinging motion required of swing arms 30, bushing assemblies 166 together with bushing assemblies 160 are sufficient to accommodate the swinging motion of the arms 30. Bushings such as bushings 160 and 166 are articles for commerce. Of course, if desired, bushings capable of a full 360 degrees of rotation may be used in place of bushings 160 and 166. Alternatively, various types of bearings may be utilized in lieu of bushings 160 and 166.

As shown in FIG. 7, aligned through-holes 170 and 172 are formed in the lower portions of the leg structures 80 and swing arms 30. Bolts or other types of fasteners can be disposed within the aligned holes to retain the leg structures and swing arms from relative motion, for example during shipment of the conveyor 20. Once the conveyor is ready for operation, the fasteners can be removed.

The drive system 26 may include a servo-type drive motor 200 which is mounted on base structure 24 by the use of a formed mounting bracket 202, which is welded or otherwise securely affixed to the overhead crossbars 62 used to interconnect the base structure side rails 60. As shown in FIGS.

3 and 8, the mounting bracket 202 depends vertically downwardly from the crossbars 62. A turned lip 204 is formed along the bottom perimeter of the bracket 202 to extend diagonally downwardly and outwardly toward the adjacent side rail 60. Although not shown, gussets can be utilized between the bracket 202 and crossbars 62 to provide stiffening and structural integrity to the bracket.

Figure 8:
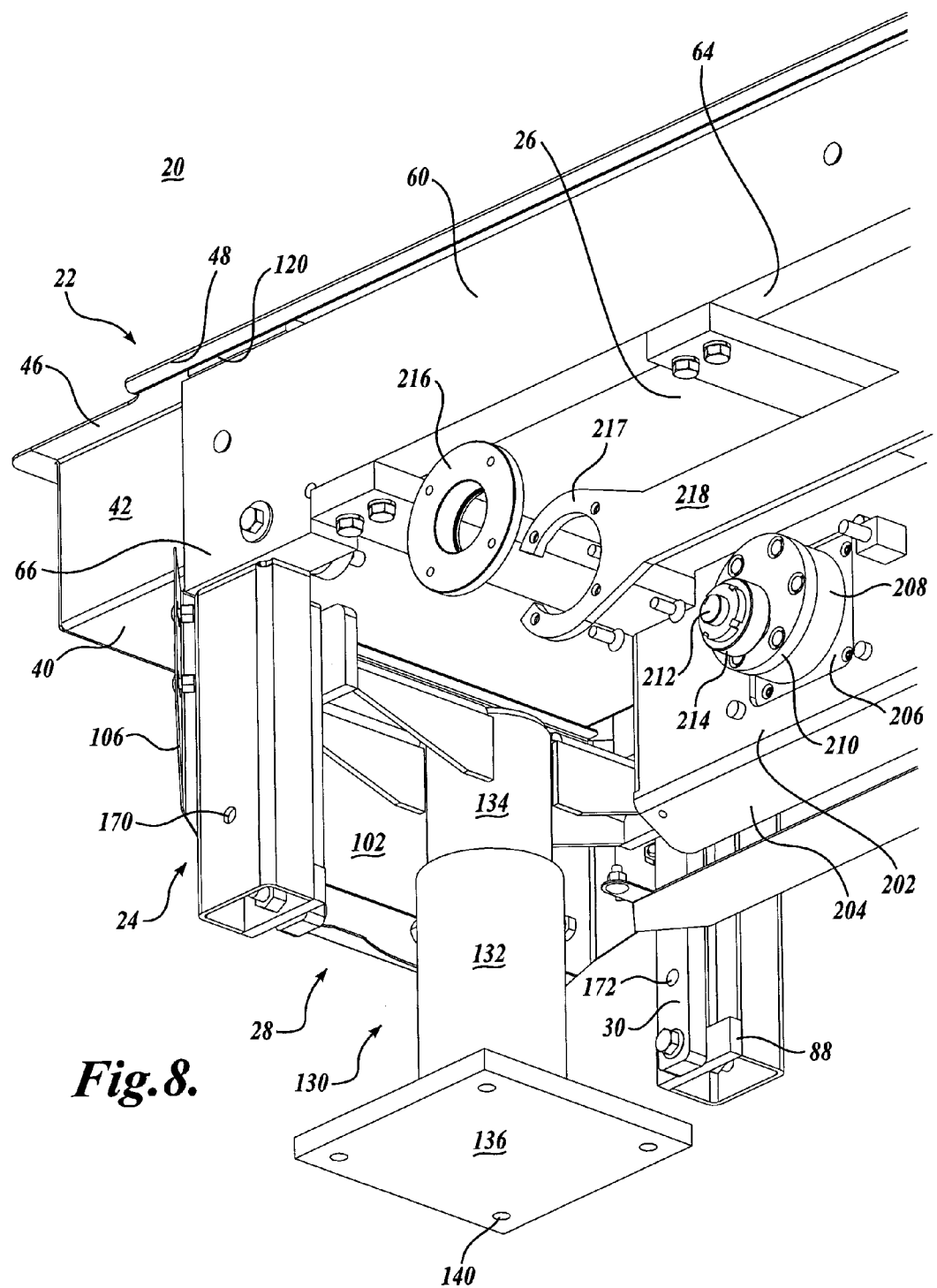
FIG. 8 is an enlarged partial pictorial view of a portion of the conveyor shown in FIG. 3 with portions exploded for clarity.

The mounting flange portion, not shown, of the drive motor 200 may be bolted or otherwise securely connected to a flange 206, which in turn is bolted or otherwise connected to bracket 202, to the side of the bracket opposite that shown in FIGS. 3 and 8. In this manner, the motor 200 may be conveniently mounted in place from the exterior side of the conveyor 20. As shown in FIGS. 3 and 8, a rectangular-shaped opening is formed in the bracket 202 to allow the motor drive shaft flange 208 to extend through the bracket. It will be appreciated that by mounting the drive motor 200 as described above, the drive motor is position below the longitudinal side rails 60 of the base structure as well as below the trough 22.

The motor drive shaft flange 208 is bolted or otherwise connected to an eccentric crank plate assembly 210, which is most clearly shown in FIG. 8. An off-center crank pin 212 extends outwardly from the face of the plate 210 at a location offset from the center of the plate 210, and thus offset from the center of the motor 200. A bearing assembly 214 is pressed over the crank pin 212, and then the bearing assembly in turn is pressed into the central hub section of a connector plate 216. The connector plate 216 is in turn bolted or otherwise securely attached to the enlarged adjacent end portion 217 of crank arm or rod 218. As shown in FIG. 8, the end portion 217 of the crank arm rod 218 may be generally in the form of a partial circular shape having a central opening to provide clearance relative to the hub section of the connector plate 216. Also, for ease of manufacture assembly and disassembly, the end portion 217 of the crank arm does not form a closed circle but is open.

Figure 5:
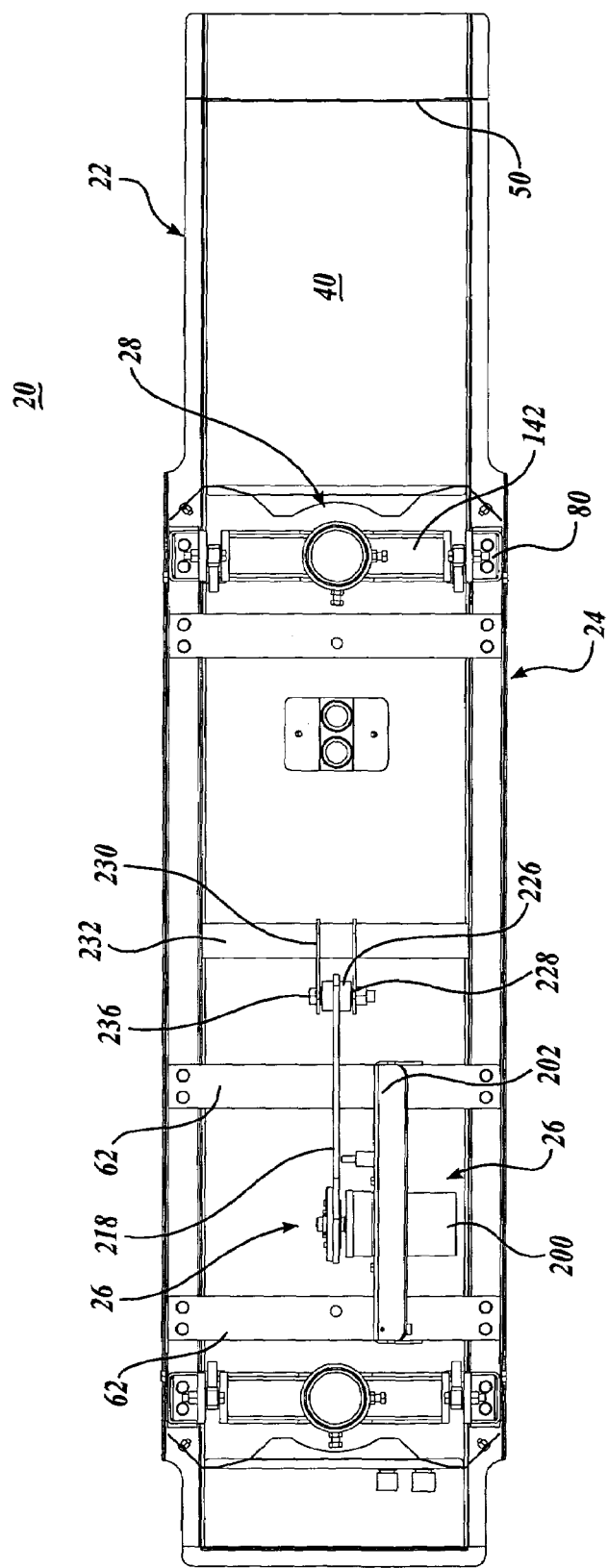
FIG. 5 is a bottom view of the conveyor of FIG. 1 with portions removed to more clearly illustrate the conveyor drive system.

The crank rod 218 may be in the form of a flat longitudinal member that can be formed from flat bar or sheet stock. Of course, the crank rod may be formed in other cross-sectional shapes, such as circular. As shown in FIGS. 3 through 5, relatively short cross sleeve 226 is welded or otherwise affixed to the end of crank rod 218 opposite motor 200. A resilient bushing 228 is pressed into the interior of the cross sleeve 226. The bushed cross sleeve is received between the distal, cantilevered ends of two parallel flat brackets 230 that extend transversely from a cross tube 232, see FIGS. 3 through 5. The cross tube 232 extends transversely beneath the trough 22 and is connected to the lower central apex portions of trough brackets 234 which extend downwardly from the exterior sidewalls 42 of the trough 22. As can be appreciated, the construction of crank rod 218, brackets 230, cross tube 232, and brackets 234 are relatively lightweight, but designed to be of sufficient structural integrity and durable to securely drivingly interconnect the trough 22 with drive motor 200. A cross pin 236 extends through clearance openings formed in the brackets 232 and through the center of the bushing 228 to interconnect the end of the crank arm/rod 218 to the brackets 230.

It will be appreciated that by the foregoing construction, the crank arm/rod 218 is positioned at or very close to the longitudinal center of trough 22 and base structure 24. This helps to retain the trough in a proper alignment with the base structure on rollers 70.

When the present invention is in use, the servo drive motor 200 reciprocates the trough 22 longitudinally relative to the length of the trough by continuous rotation of the motor in one direction only. The motor rotates crank plate 210 which is coupled to the drive shaft flange 208 of the motor. The crank pin 212 of plate 210 is offset from the center of rotation of the crank plate to provide a desired eccentricity. The crank pin 212 is connected to the adjacent end of crank rod 218 through the use of bearing assembly 214 and connector plate 216, as described above. The opposite end of the crank rod is connected to the trough 22 through the use of a resilient bushing 228, as also described above. As the servo motor 200 rotates, the eccentric crank plate 210 moves the trough 22 in one longitudinal direction during one half cycle of the servo motor rotation, and thus moves the counterweight base structure 24 180 degrees° out of phase in the opposite direction. During the second half cycle of the servo motor rotation, the eccentric crank plate 210 continues to rotate, causing the trough structure 22 to reciprocate in the reverse longitudinal direction, thereby causing the base structure 24 to swing in the opposite direction.

Material, such as food products, is conveyed along the conveyor 20 because the motor 200 accelerates the trough 22 at different acceleration rates in a first, "slow" direction relative to the opposite, "fast" direction during rotation of the motor. The acceleration rate is set during the slow direction with movement of the trough so that the force generated due to the reaction of the mass of the material being conveyed is less than the friction force between the material and the trough. This friction force is provided by the equation: $F_f = \mu_s \times m \times g$. In this equation, $\mu_s$ is a static coefficient of friction of the material, m is a mass of the material, and g is acceleration due to gravity. As a result, the conveyed materials move with the trough.

During the second faster half cycle of the motor, the acceleration rate of the trough is sufficiently greater than the friction force so that the material slips on the trough surface.

Figure 9:
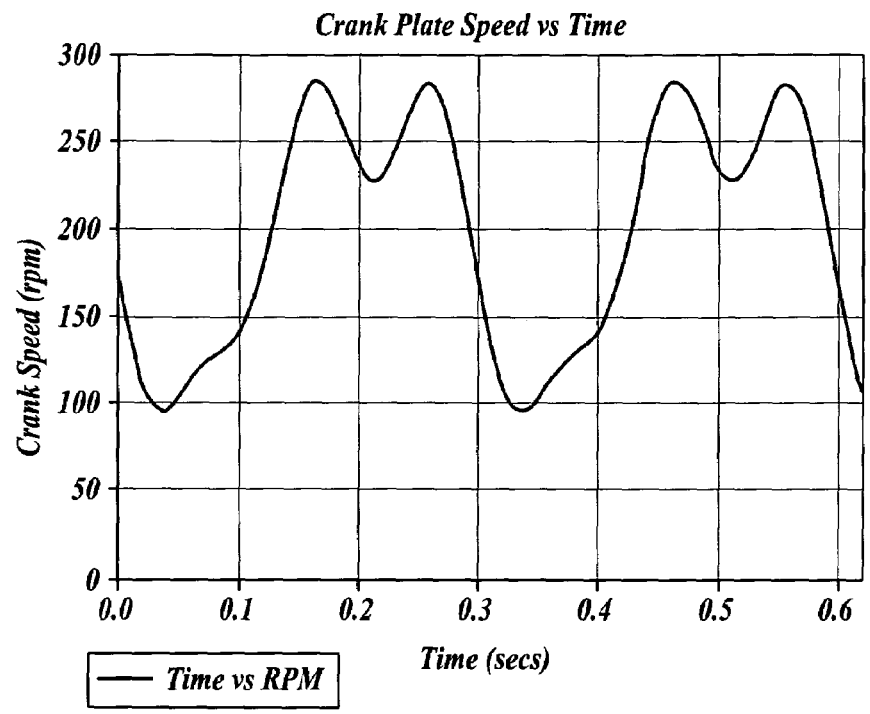
FIG. 9 is a plot of drive crank speed versus time.

The desired acceleration rate of the trough 22 is achieved by continuously varying the speed of the servo motor to achieve desired velocity patterns or profiles of the crank plate 210. One such velocity profile is shown in FIG. 9, which plots the speed of crank plate 210 over time. The crank plate speed may be converted into the linear velocity of the trough through the equation:

$$v_x = -\omega A \sin(\omega t + \phi)$$

Figure 10:
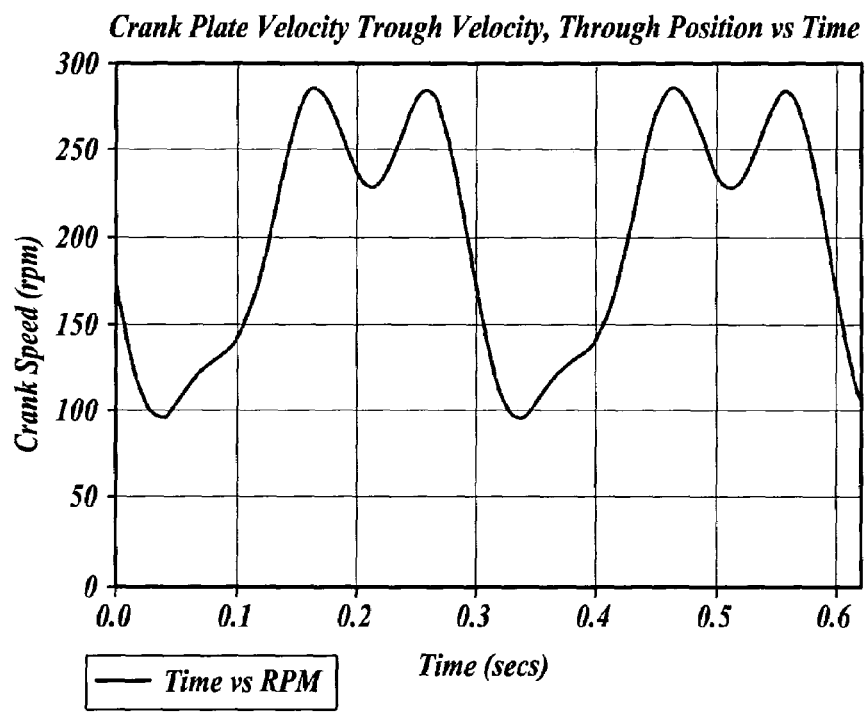
FIG. 10 is a plot of drive crank speed, trough velocity, and trough position versus time.
Figure 11:
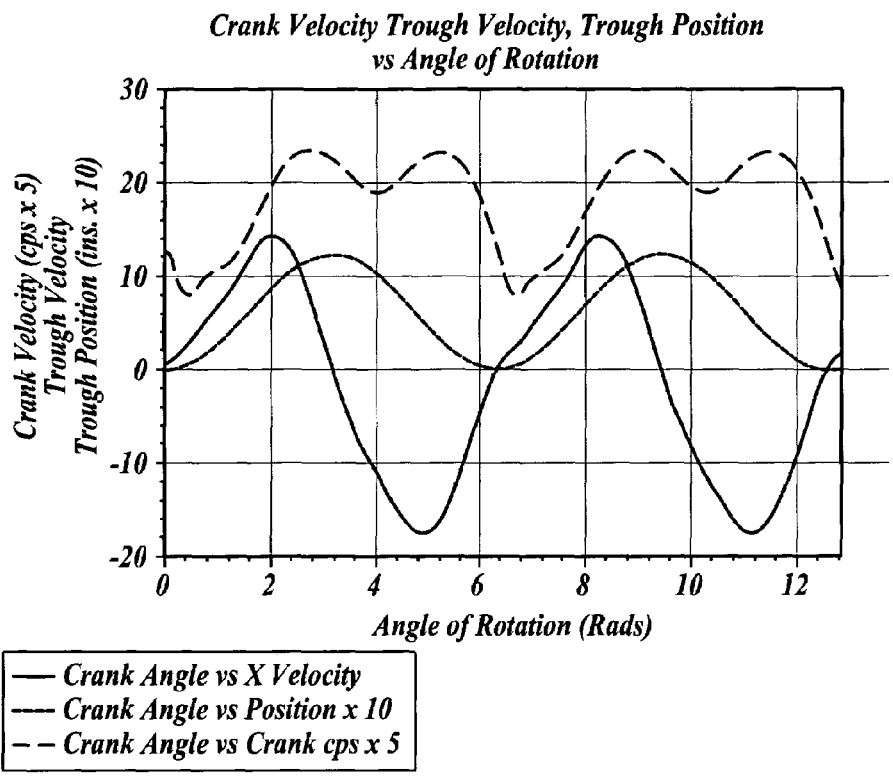
FIG. 11 is a plot of crank velocity, trough velocity, and trough position versus angle of rotation of the crank.

Where:
$v_x$=Velocity in the x direction
$\omega$=Angular velocity=$2\pi f$
f=Frequency (rpm)
A=Amplitude
t=Time
$\phi$=Phase angle The linear velocity of the trough can be varied to achieve the desired acceleration of the trough, by varying the speed of the servo motor. FIG. 10 is a plot of the velocity of crank plate 210 and the velocity of trough 22 over time. FIG. 10 also plots the position of the trough 22 over time. FIG. 11 is similar to FIG. 10, but plots the angular velocity of crank plate 210, the linear velocity of the trough 22, and the position of the trough versus the angle of rotation of the crank plate.

Figure 12:
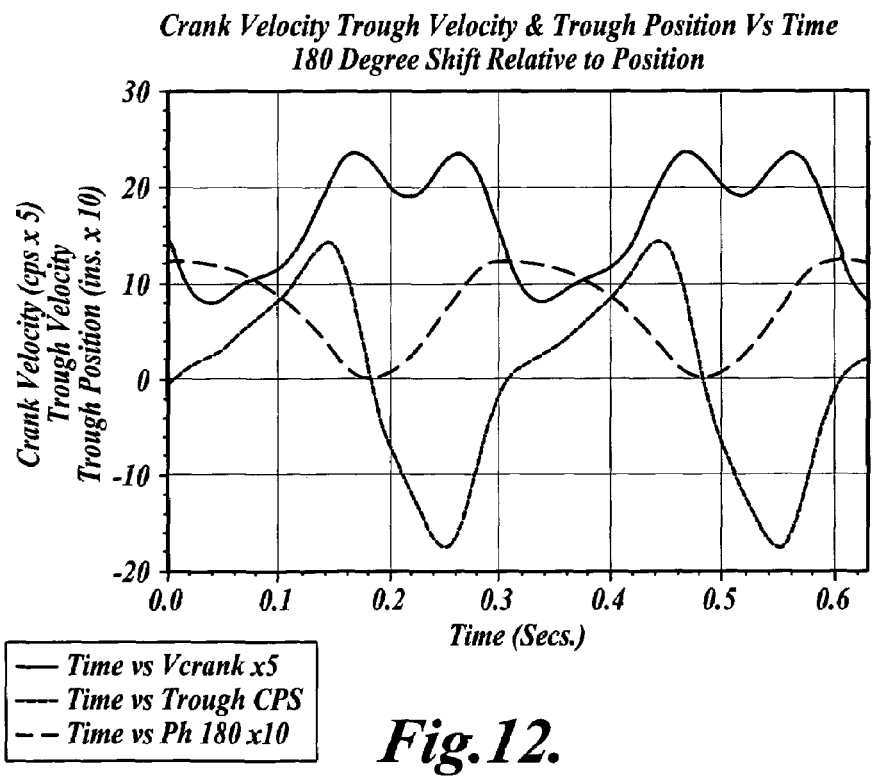
FIG. 12 is a plot of crank velocity, trough velocity, and trough position versus time wherein the trough position is shifted 180° from that shown in FIG. 10.

An electronic controller (not shown) is utilized to control the speed of the servo motor 200 as a function of the rotational position of the motor drive shaft in a manner well known. Such controllers include semiconductor power control devices, interface electronics, and a microcomputer control system with memory components used to store one or more velocity patterns of the crank plate 210 which are required to produce a desired linear trough velocity relative to the varying coefficients of friction of the different materials being conveyed on the trough 22. The controller is capable of keeping track of the rotational or crank angle of crank plate 210 relative to the velocity profile of the crank plate so that the conveyor feed direction can be reversed, if desired. In this manner, the material on the conveyor can be moved in the opposite direction. FIG. 12 is a plot of the rotational velocity of crank plate 210 over time, the linear velocity of trough 22 over time, as well as the position of the trough 22 over time when the velocity profile of the crank plate is shifted 180 degrees so that the conveyor 20 is capable of moving material in the opposite direction.

Figure 13:
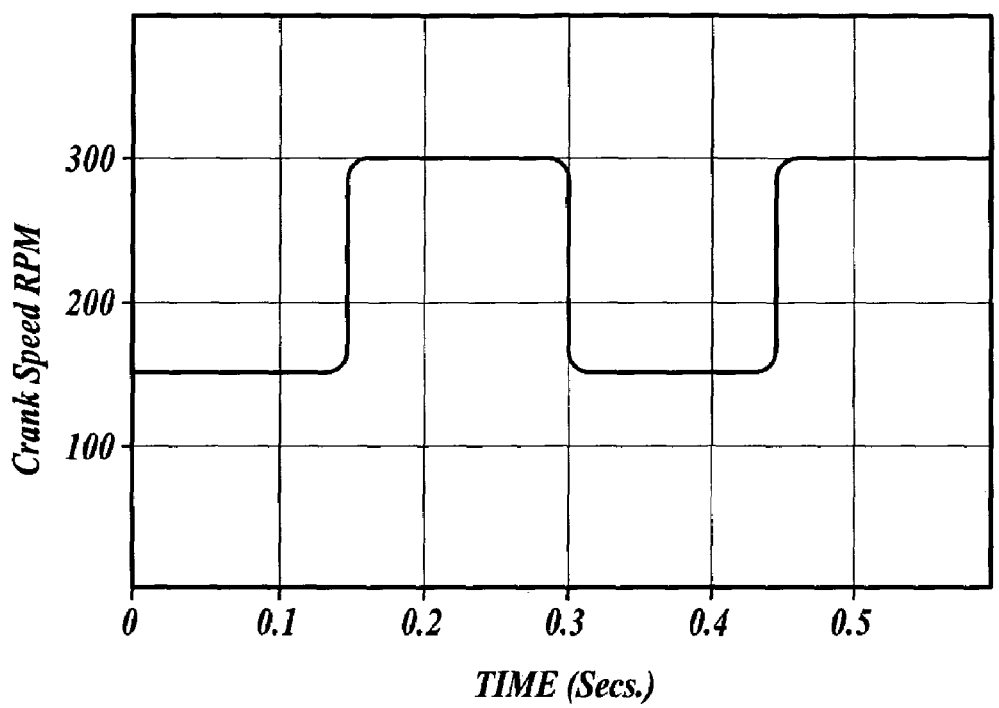
FIG. 13 is a plot of crank speed versus time for a typical prior art conveyor system.

It will be appreciated that the present invention employs a servo motor in a manner unlike the inefficient and limited feed rate drives of the prior art motor driven conveyors, discussed above, wherein the drives were configured to operate at one speed during a first half cycle of rotation and a second, faster speed during the remaining half cycle of operation. A graph of such cycle is shown in FIG. 13. FIG. 13 illustrates a conveyor operating at 200 cycles per minute, wherein the motor speed during one half cycle is 150 rpm and 300 rpm during the remaining half cycle. As noted above, various and numerous components, for example, pulleys, belts, bearings, and counterweights, were required to overcome the motion and force imbalance problems in the two-speed single rotation drive systems of the prior art.

The servo motor 200 was selected to match the power and speed requirements needed for the conveyor 20. One servo motor that may be utilized with the present invention is Model TPM 25, manufactured by Whittenstein Company of Germany. Other servo motors may be utilized to carry lighter or heavier loads.

As also noted above, some prior art drive systems sought to overcome the motion and force imbalance problems by reversing the direction of rotation of a servo motor drive during the high-speed portion of the conveying cycle. This reversal of drive direction introduces electrical operating inefficiencies, and still does not address the issue of conveying efficiencies due to two-speed operation. To address the issues of conveying and power inefficiencies of the prior art, the servo motor drive of the present invention is configured to rotate in one direction only, but at a continuously variable speed, thereby to achieve the acceleration rate desired, as discussed above.

Figure 6:
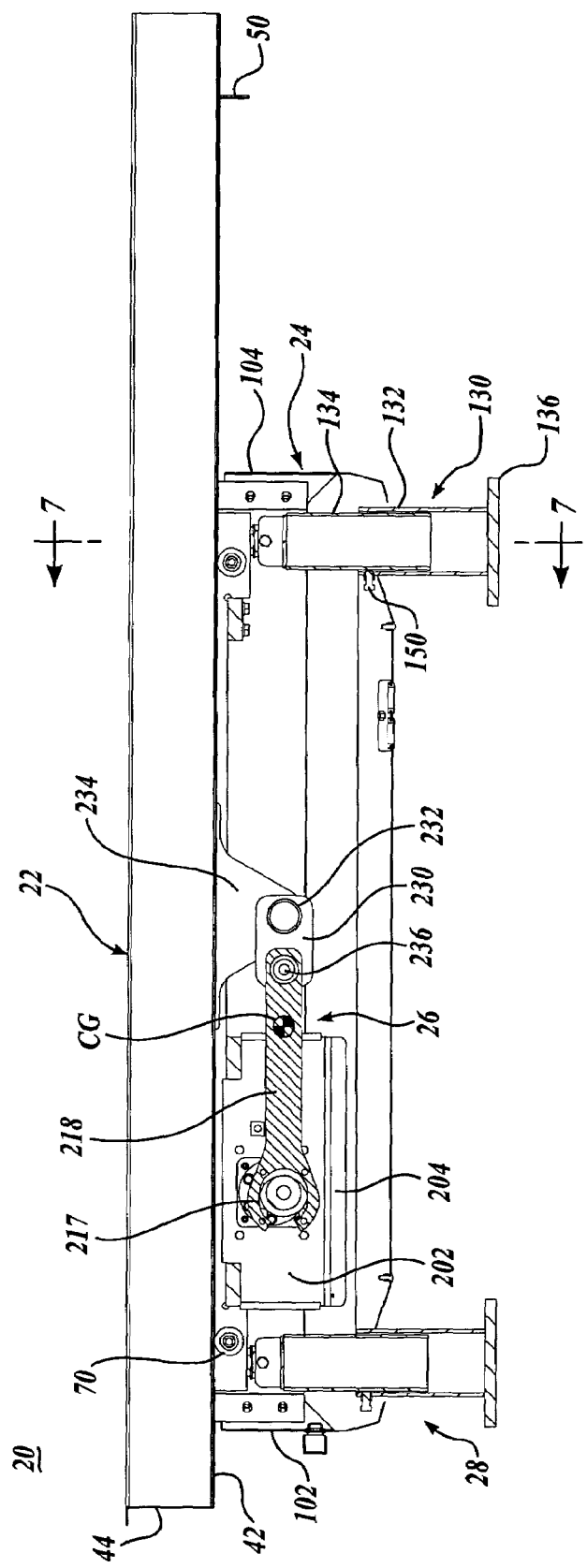
FIG. 6 is a side elevational view of the conveyor shown in FIG. 1, with portions removed so that the drive system of the conveyor is more clearly visible.

Another way that the present invention overcomes unwanted dynamic and unbalanced forces is through interconnecting the trough 22 and counterweight base 24 to move 180 degrees out of phase with each other in such a way that any driven or inertial forces generated thereby pass through the center of gravity (CG) of the conveyor structure 20, or so close to the center of gravity that for all practical purposes, all horizontal forces are balanced, thereby essentially avoiding potential off-axis forces. The vertical position of the center of gravity is shown in FIG. 6. To help bring this center of gravity to an elevation whereby the generated forces pass through it, trough 22 is nested in or cradled by the two longitudinal rails 60 of the base structure 24. The significant weight of the four leg structures 80 of the base structure 24 also help to lower the center of gravity into an alignment position with the driven force.

A further goal of the present invention was to improve the isolation of the conveyor to minimize forces transmitted to the frame 28 and also to enable the conveyor to be suspended by cables, as described below, as desired by many users of conveying equipment. To this end, the weight of the counterweight base structure 24 is made considerably greater than the weight of the trough 22. Since the servo motor 200 is connected directly to the base structure 24, a common driving force is applied simultaneously to the trough and base structure in opposing directions. As a result, the motion of the counterweight base 24 is a fraction of the motion of the trough 22, which motion is inversely proportional to the weight ratio of the trough and base structures.

The relatively slight motion of the counterweight base structure 22 enables the isolation of the conveyor by suspension on relatively short rubber/elastomer bushed rocker arms 30 connected to frame 28 by hardware members and spacers, or optionally to a suspension frame, as discussed below. Since the vertical component of the arc of travel between the center of rotation of the rocker arms 30 and the connection to the base structure 24 is very small, the resultant dynamic motion is miniscule and easily absorbed by the resilient bushings 160 and 166 of the rocker arms.

Figure 14:
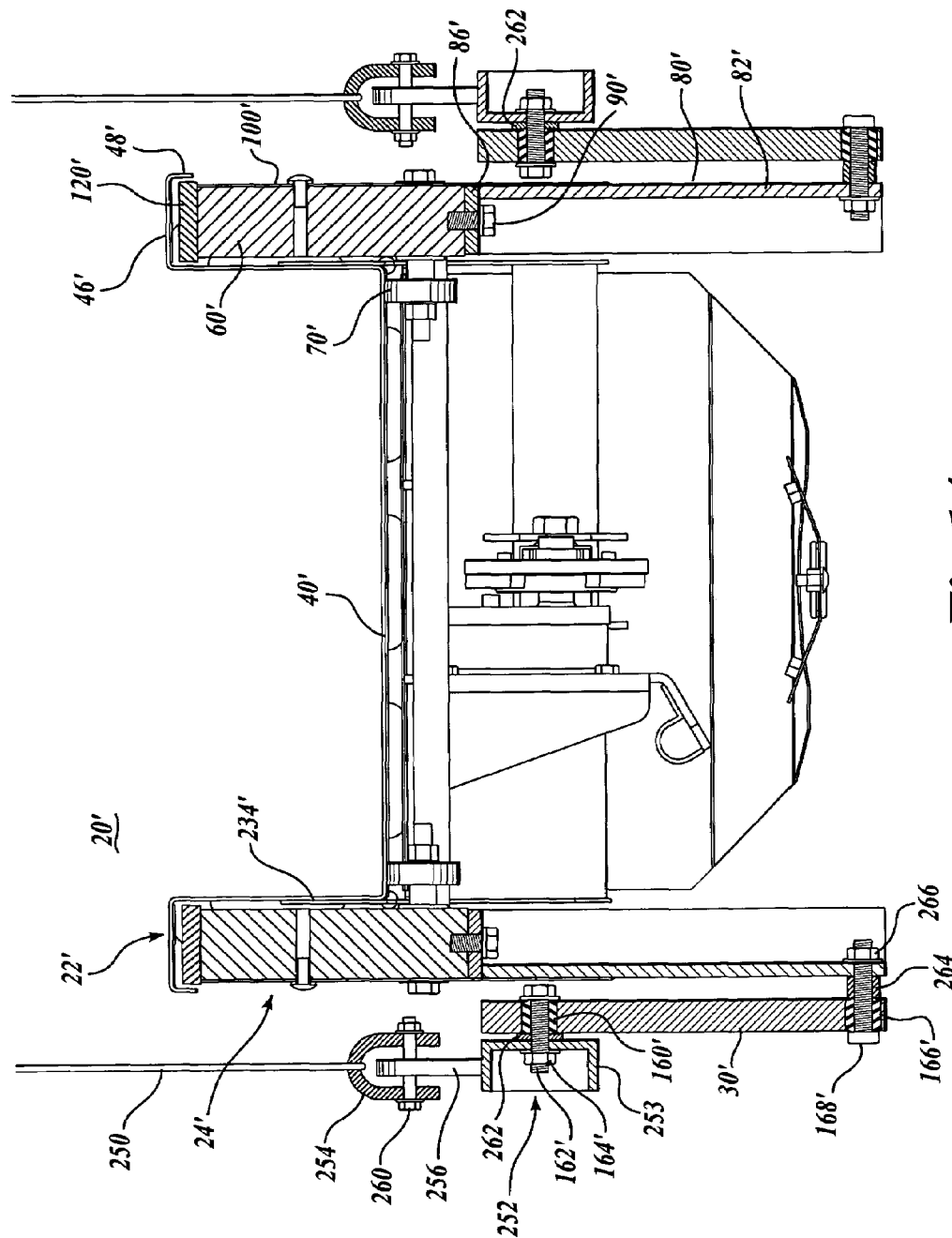
FIG. 14 is a view similar to FIG. 7, but illustrating an alternative embodiment of the present invention.

As one non-limiting example of the present invention, the weight ratio between the trough structure 22 and the base structure may be about 1:3. However, the weight ratios may be in the range of about 1:2 to 1:5. Thus, with the trough stroke of 1.25", the resulting stroke of the counterweight base member would be approximately 0.42". With rocker arms of a length of 10", a maximum dynamic vertical displacement of the conveyor members would only be 0.0022", which is easily absorbed by the resilient bushings 160 and 166. This displacement is calculated from the formula:

$$\theta = \frac{l}{2r} = \frac{.4167}{20} = .020835$$

$$\text{and } \cos\theta = \frac{b}{r}$$

where:

$b = r \cdot \cos\theta = 10 \cdot 0.999783 = 9.99783$ $\therefore x = r - b = 10. - 9.99783 = 0.00217$ and where:
l=Base stroke
r=Length of rocker arm
θ=Angle of bisected arc
b=Distance from base of arc to center of subscribed circle
x=vertical displacement FIG. 14 illustrates an alternative embodiment of the present invention wherein the conveyor 20' is suspended from overhead cables 250 rather than being mounted on the floor in the manner of conveyor 20 shown in FIGS. 1 through 8. (In FIG. 14, components of the present invention corresponding to components shown in FIGS. 1 through 8 are identified by the same part number, but with the addition of a prime (') designation.) A suspension frame structure 252 is utilized in conjunction with cables 250 to support the conveyor 20'. As shown in FIG. 14, the suspension frame 252 surrounds the base structure 24 at an elevation below trough structure 22. The suspension frame may be composed of channel members 253, rectangular tubing, square tubing, or other structural members. The suspension frame is attached to the lower ends of cables 250 by devises 254 attached to the cables. Eye hooks 256 are welded, bolted, or otherwise attached to the suspension frame at locations in alignment with the four leg structures 80'. The devises 254 are connected to the eye hooks 256 by bolts 260 or other appropriate hardware members.

The base structure 24' is connected to the suspension frame 252 by rocker arms 30' which are positioned outboard of the leg structures 80' rather than inboard of the leg structures in a manner of the embodiment of the present invention shown in FIGS. 1 through 8. In construction, the rocker arms 30' may be essentially identical to rocker arms 30. In this regard, bushings 160' are received within clearance openings formed in the upper ends of the rocker arms 30'. Mounting bolts 162' extend through the center of the bushing assembly and through clearance openings formed in the suspension frame structure, to threadably engage nuts 164' for retaining the bushing assembly and connecting the upper ends of the rocker arms 30' to the suspension frame structure.

The lower ends of rocker arms 30' are attached to the leg structures 80' in a similar manner. To this end, a bushing assembly 166' is engageable within a through-opening formed in the lower end of rocker arm 30'. A bolt 168' extends through the center of bushing assembly 166', through a spacer 264, through a clearance opening formed in leg structure 80' to engage a nut 266 or other type of fastener. It will be appreciated that, by the foregoing construction, the swing arms 30' operate in a corresponding manner to swing arms 30, discussed above. Moreover, as discussed above, the relatively small displacement of the base structure 24' and the balancing of the horizontal forces generated during the operation of the conveyor 20' enables the conveyor to be successfully suspended from cables 250.

The present invention disclosed herewith addresses shortcomings of the motor powered prior art conveyors relative to conveying efficiencies and throughput, by emulating and improving upon the smooth harmonic velocity profile patterns of the mechanical "four shaft" conveyors discussed above. Further, by shifting such velocity profile patterns to be 180 degrees out of phase with the position of the drive arm, the feed direction of the conveyor may be reversed by simply throwing a switch on the control box. The present invention also simplifies the conveyor structure to improve dynamic performance and to reduce manufacturing and maintenance cost. In addition, the present invention improves isolation efficiency such that the conveyor may be suspended or floor mounted with minimal forces being transmitted to the mounting structure.

While the preferred embodiment of the invention has been illustrated and described, it will be appreciated that various changes can be made therein without departing from the spirit and scope of the invention.

The invention claimed is:

1. A differential motion conveyor for conveying products, comprising:
    (a) an elongated trough structure;
    (b) a counterweight base structure disposed to support the trough structure;
    (c) an interconnection system for interconnecting the trough structure to the base structure for opposite reciprocal movement of the trough structure and the base structure in a direction lengthwise of the trough structure; and
    (d) a drive system to oppositely reciprocate the trough structure and the base structure in a direction lengthwise of the trough structure at a varying velocity to achieve a desired differential acceleration rate of the trough structure between the two opposing directions of longitudinal movement of the trough structure.

2. The conveyor according to claim 1, wherein the weight of the counterweight base structure is substantially greater than the weight of the trough structure.

3. The conveyor according to claim 1, wherein the drive system comprises a control system to accelerate the trough structure in one direction at a slow enough speed to substantially avoid relative sliding movement between the conveyed products and trough structure and to accelerate the trough structure in the opposite direction at a fast enough speed to achieve relative sliding movement between the conveyed product and the trough structure.

4. The conveyor according to claim 3, wherein said control system controls the speed of the drive system to achieve different acceleration levels of the trough structure.

5. The conveyor according to claim 1, wherein the drive system drives the trough structure at a substantially continually varying velocity.

6. The conveyor according to claim 1, wherein the drive system comprises:
    a rotatable actuator rotating in a singular direction; and
    a connector assembly to interconnect the actuator with the trough structure.

7. The conveyor according to claim 5, wherein the rotatable actuator comprises a servo motor.

8. The conveyor according to claim 1, wherein the drive control system is capable of controlling the rotatable actuator to be selectively altered to be 180° out of phase relative to the nominal rotational position of the rotary actuator, thereby to reverse the direction that the products can be conveyed along the trough.

9. A differential motion conveyor for conveying products, comprising:
    (a) an elongated trough structure;
    (b) a base structure;
    (c) a support system for the trough structure to support the trough structure for reciprocal movement of the trough structure relative to the base structure in a direction lengthwise of the trough structure;
    (d) a drive system to reciprocate the trough structure lengthwise of the trough structure at a varying velocity to achieve a desired differential acceleration rate of the trough structure between the two opposing directions of longitudinal movement of the trough structure; and
    (e) wherein the support system is selected from the group consisting of:
        a plurality of rollers interposed between the trough structure and base structure;
        a slide and slideway interposed between the trough structure and base structure;
        a plurality of pivot arms interposed between the trough structure and base structure; and
        a plurality of suspension lines interposed between the trough structure and base structure.

10. The conveyor according to claim 1, wherein the trough structure and the counterweight base structure are configured so that the horizontal forces generated during operation of the conveyor pass through or close to the center of gravity of the conveyor.

11. The conveyor according to claim 1, wherein said drive system moves the trough structure and counterweight base structure in opposite directions at approximately 180° out of phase from each other.

12. The conveyor according to claim 1, further comprising a support frame to support the counterweight base structure at a desired elevation while allowing the base structure to reciprocate relative to the movement of the trough structure.

13. The conveyor according to claim 12, further comprising substantially upright swing arms having upper end portions coupled to the support frame and lower end portions coupled to the counterweight base structure.

14. A differential motion conveyor for conveying products, comprising:
 a. an elongate trough structure;
 b. a counterweight base stricture;
 c. said trough structure and said counterweight base structure adapted to oppositely reciprocate relative to each other in a direction longitudinally of the length of the trough structure;
 d. a drive system drivingly interconnecting the trough structure and counterweight base structure to reciprocate in opposite directions to each other and to vary the velocity of the trough structure to achieve desired levels of acceleration of the trough structure in the different directions of travel of the trough structure; and
 e. a support frame for supporting the counterweight base structure for reciprocal movement of the counterweight base structure.

15. The conveyor according to claim 14, further comprising a support system for supporting the trough structure for opposite reciprocal movement of the trough structure relative to the counterweight base structure.

16. A differential motion conveyor for conveying products, comprising:
 a. an elongated trough structure;
 b. a base structure;
 c. said trough structure adapted to reciprocate relative to the base structure longitudinally of the length of the trough structure;
 d. a drive system drivingly interconnecting the trough structure and base structure to move in opposite relative directions and to vary the velocity of the trough structure to achieve desired levels of acceleration of the trough structure in the different directions of travel of the trough structure;
 e. a support frame for supporting the base structure for reciprocal movement; and
 f. a support system for supporting the trough structure for reciprocal movement of the trough structure relative to the base structure, wherein the support system is selected from the group consisting of:
 a plurality of rollers interposed between the trough structure and the base structure;
 a slide and slideway interposed between the trough structure and the base structure;
 a plurality of pivot arms interposed between the trough structure and base structure; and
 a plurality of suspension lines interposed between the trough structure and base structure.

17. The conveyor according to claim 14, wherein the drive system is carried by the counterweight base structure and comprises a rotatable actuator rotating in a singular direction, said actuator interposed between the trough structure and counterweight base structure.

18. The conveyor according to claim 17, wherein the rotatable actuator comprises:
 a servo motor; and
 a control system to vary the speed of the servo motor in a desired manner to achieve selected levels of acceleration of the trough structure.

19. The conveyor according to claim 17, wherein the drive system substantially continually varies the velocity of the trough structure.

20. The conveyor according to claim 14, wherein the counterweight base structure is of a height significantly greater than the height of the trough structure.

21. The conveyor according to claim 14, wherein the trough structure and counterweight base structure are constructed so that the horizontal forces generated during the operation of the conveyor pass through, or close to, the elevation of the center of gravity of the conveyor.

22. The conveyor according to claim 14, wherein the drive system drives the trough structure and counterweight base structure in opposite directions at approximately 180 degrees out of phase from each other.

23. A method for conveying products, comprising:
 placing the products on a trough structure, wherein the trough structure is coupled to a counterweight base structure by a rotational drive system; and
 driving the rotational drive system in a singular direction at a varying velocity, thereby to achieve desired differential levels of acceleration of the trough structure as the trough structure moves in one longitudinal direction of the trough structure relative to the opposite movement of the counterweight base structure and as the trough structure and counterweight base structure move in the opposite longitudinal direction of the trough structure.

24. The method of claim 23, further comprising controlling the speed of the drive system to accelerate the trough structure in one direction at a slow enough speed to substantially avoid relative sliding movement between the conveyed products and the trough structure and accelerating the trough structure in an opposite direction at a fast enough speed to achieve relative sliding movement between the conveyed products and the trough structure.

25. The method according to claim 23, further comprising:
 disposing the drive system to be supported by the counterweight base structure; and
 configuring the rotational drive system as a servo motor rotating in a singular direction.

26. The method according to claim 23, wherein the rotational drive system operates at a substantially continually varying velocity.

27. The method according to claim 23, wherein the trough structure is substantially lighter in weight than the counterweight base structure.

* * * * *